United States Patent
Moudilou et al.

(10) Patent No.: US 9,676,014 B2
(45) Date of Patent: Jun. 13, 2017

(54) PROCESS FOR TREATING POLLUTED SOILS BY MEANS OF A SULFOALUMINATE CLINKER BASED HYDRAULIC BINDER AND USE THEREOF FOR STABILIZING POLLUTED SOILS

(71) Applicant: Ciments Francais, Puteaux (FR)

(72) Inventors: Emmanuel Moudilou, Breuilpont (FR); Cyril Guerandel, Paris (FR); Bruno Le Rolland, Oinville sur Montcient (FR); Stephanie Delair, Poissy (FR)

(73) Assignee: CIMENTS FRANCAIS, Puteaux (FR)

( * ) Notice: Subject to any disclaimer, the term of this patent is extended or adjusted under 35 U.S.C. 154(b) by 0 days.

(21) Appl. No.: 14/400,850

(22) PCT Filed: May 13, 2013

(86) PCT No.: PCT/FR2013/051044
§ 371 (c)(1),
(2) Date: Nov. 13, 2014

(87) PCT Pub. No.: WO2013/171418
PCT Pub. Date: Nov. 21, 2013

(65) Prior Publication Data
US 2015/0132063 A1    May 14, 2015

(30) Foreign Application Priority Data
May 14, 2012   (FR) ..................... 12 54393

(51) Int. Cl.
*B09C 1/00*    (2006.01)
*B09C 1/08*    (2006.01)
(Continued)

(52) U.S. Cl.
CPC ............ *B09C 1/08* (2013.01); *C04B 40/0028* (2013.01); *C04B 2111/00732* (2013.01);
(Continued)

(58) Field of Classification Search
CPC ....................................................... B09C 1/08
See application file for complete search history.

(56) References Cited

U.S. PATENT DOCUMENTS 4,209,335 A * 6/1980 Katayama ................. B09C 1/08
106/645
8,574,359 B2 * 11/2013 Marchi ................... C04B 7/323
106/692

(Continued)

*Primary Examiner* — John Kreck
(74) *Attorney, Agent, or Firm* — IPSILON USA

(57) ABSTRACT

A process for treating polluted soils, in particular soils with a leachable fraction greater than 0.4%, wherein the leachable fraction contains predominantly anions, in particular sulfate ions, and/or heavy metals, includes mixing the soil with a sulfoaluminate-clinker-based hydraulic binder, in soil/binder weight proportions of between 1 and 40 parts of binder per 100 parts of soil, the sulfoaluminate clinker containing more than 50% by weight of ye'elimite $C_4A_3S$ phase, less than 15% by weight of belite C2S phase, and from 1% to 5% by weight of free lime CaO. The process is used for stabilizing soils in situ or before dumping, soils polluted in particular with sulfate anions and/or heavy metal cations.

18 Claims, 1 Drawing Sheet

(51) Int. Cl.
*C04B 40/00* (2006.01)
*C04B 111/00* (2006.01)

(52) U.S. Cl.
CPC .... *C04B 2111/00767* (2013.01); *Y02W 30/91* (2015.05); *Y02W 30/92* (2015.05); *Y02W 30/94* (2015.05)

(56) References Cited

U.S. PATENT DOCUMENTS

2004/0077918 A1* 4/2004 McLeod ............... B09B 3/0041
588/316
2011/0185950 A1* 8/2011 Cassat .................. C04B 18/021
106/694

* cited by examiner

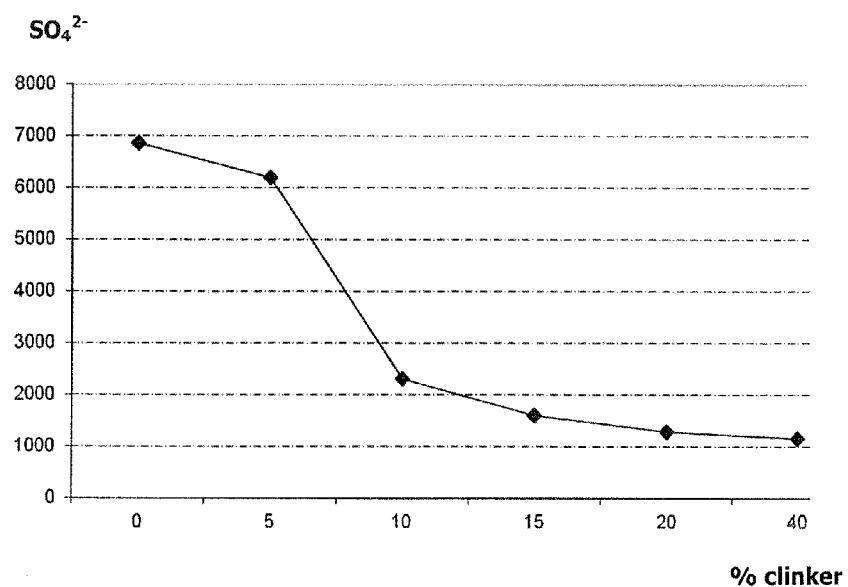

PROCESS FOR TREATING POLLUTED SOILS BY MEANS OF A SULFOALUMINATE CLINKER BASED HYDRAULIC BINDER AND USE THEREOF FOR STABILIZING POLLUTED SOILS

The present invention relates to a process for the treatment of polluted soil using a hydraulic binder and to its use in the context of the treatment of polluted soils.

A subject matter of the present invention is a hydraulic binder comprising mineralogical phases placing it in the category of the sulfoaluminate binders. Another subject matter of the present invention is the use of this binder in the treatment of a material, in particular of a soil or an earth, polluted or contaminated by ionic chemical entities or heavy metals. The treated material remains loose but the leaching of the polluting entities is reduced.

The landfilling of soils contaminated by pollutants, in particular soils originating from industrial sites, complies with strict regulations (Directive 1999/31/EC of the Council of Apr. 26, 1999 and Decision No. 2003/33/EC of 12/19/02). The forms for landfilling these soils are determined according to their classes of pollution. These classes range from class I (dangerous waste) to class III (inert waste). The more dangerous a soil is regarded as being, the more the landfilling thereof results in constraints and consequently in a high cost. In order to be able to store these contaminated soils in landfills, at the lowest cost, it is advisable to lower the class of dangerousness thereof. This modification to the class of dangerousness can in particular be obtained by lowering the content of leachable pollutants present in the soil.

Lowering the class of dangerousness can also make it possible to reemploy the soils thus treated, for example in road bases or in backfills (in accordance with the SETRA guide "Acceptability de materiaux alternatifs en technique routiere. Evaluation environnementale" [Acceptability of alternative materials in road engineering. Environmental Evaluation], March 2011).

In cement terminology, the primary compounds are represented by C for CaO, S for $SiO_2$, A for $Al_2O_3$, $ for $SO_3$, H for $H_2O$, T for $TiO_2$ and F for $Fe_2O_3$, which will be used throughout the present text.

Hydraulic binders are already used for the treatment of industrial effluents (liquid wastes) and incineration residues in a finely divided form, in particular to trap certain anions.

This is the case in particular with the hydraulic binders sold by Kerneos under the trade name LSR and described in the European patent EP 0 588 689, which are high-alumina cements. The predominant mineralogical phases of these high-alumina cements are Ca or CA and $C_{12}A_7$ or $C_3A$ and $C_{12}A_7$.

The finely divided wastes are first treated with a high-alumina binder comprising three predominant phases $C_3A$, $C_{12}A_7$ and CaO. The treated product thus obtained is subsequently crushed and the aggregates are coated in a cement of Portland type to improve their resistance to leaching. This process thus requires a large amount of coating binder. In addition, the patent discloses the final content of chlorides of the leachate after curing for 28 days but gives no information on the content of sulfate ions. Two types of high-alumina binders are described comprising the respective phases $C_3A/C_{12}A_7$/CaO in proportions of 20/80/0 and 80/0/20. No reference is made to a $C_4A_3$$ phase.

Processes for rendering inert and treating polluted soils by means of hydraulic binders sold by Holcim under the trade name Inercem are also known. These binders are mixtures of clinker (Portland) and blast furnace slag. The different products are: Inercem P (more than 65% of clinker and less than 20% of slag), Inercem S (more than 80% of slag and more than 10% of clinker) and Inercem midway between the two preceding products (less than 30% of clinker and more than 60% of slag). These products are described in the commercial brochure: "Inercem Liants hyrauliques pour stabilization des dechets courants" [Inercem Hydraulic binders for the stabilization of everyday wastes] (Holcim Belgique, February 2009).

It is apparent that these binders are not sufficiently effective to trap the sulfate ions when the soil to be treated is polluted by such readily leachable anions, which are released into rainwater or infiltration water.

A process of treatment of marine sediments having a high water content using a binder based on sulfoaluminate clinker which makes it possible to render marine sediments able to be rapidly handled without using quick lime is known from WO 2010/043495. The reaction of said binder with the sediments brings about their rapid drying (change in texture) and causes setting for the purpose of long-term storage of the treated sediments.

The first aim of the invention is thus to provide a hydraulic binder capable of trapping the anions, such as sulfate irons and/or the heavy metals present in contaminated materials, in particular polluted soils, and of limiting their leaching.

Another aim of the invention is to provide a hydraulic binder which makes it possible to treat and to render inert a polluted soil in a single stage and in situ, that is to say which does not require transfer to another site.

Another aim of the invention is thus to provide a process for the treatment of a polluted soil by addition of hydraulic binder in a small amount, which makes it possible to reduce the cost of the treatment in comparison with the binders and processing methods of the prior art.

Yet another aim of the invention is to provide a process for treating and rendering inert the polluted soil before it is landfilled.

To this end, the present invention provides a process for the treatment of polluted soils, in particular of soils exhibiting a leachable fraction of greater than 0.4%, said leachable fraction predominantly including anions, in particular sulfate ions, and/or heavy metals, characterized in that it comprises the mixing of said soil with a hydraulic binder based on sulfoaluminate clinker in soil/binder proportions by weight of between 1 and 40 parts of binder per 100 parts of soil, said sulfoaluminate clinker including more than 50% by weight of ye'elimite $C_4A_3$$ phase, less than 15%, in particular from 5% to less than 15%, by weight of belite $C_2S$ phase and from 1% to 5% by weight of free lime CaO.

The process for the treatment of the soil with said hydraulic binder makes it possible to create stable chemical entities, in particular ettringite, within the polluted soil.

The soil thus treated remains easy to handle (to shovel or to transport). The treatment does not require handling operations which are burdensome from a logistical viewpoint; that is to say that it does not require transportation of a large volume of materials (soil or binder) or special infrastructures. The treatment provided is simple to carry out, economically advantageous and ecologically advantageous.

The process of the present invention is particularly suitable for the treatment of a soil including a water content of less than 40%, in particular less than 30%, preferably less than 20%, by weight.

Preferably, in the hydraulic binder employed in the process of the present invention, the sulfoaluminate clinker includes more than 60% by weight of ye'elimite $C_4A_3\$$ phase.

According to an advantageous embodiment, said sulfoaluminate clinker includes from 5% to less than 15%, preferably from 8% to 13%, by weight of belite $C_2S$ phase.

According to an advantageous embodiment, the sulfoaluminate clinker includes from 2% to 12%, preferably from 2% to 3%, by weight of mayenite $C_{12}A_7$ phase or of a mayenite isotype.

In the context of the present invention, the $C_{12}A_7$ phase encompasses any isotypic $C_{12}A_7$ structure, such as, for example, $C_{11}A_7.CaF_2$, the structure of which results from a replacement of $O^{2-}$ ions by $F^-$ ions. In the continuation of the description, $C_{12}A_7$ should be understood as meaning $C_{12}A_7$ or any isotypic structure, in particular $C_{11}A_7.CaF_2$ and $C_{11}A_7.CaCl_2$.

Ordinarily, the sulfoaluminate clinker according to the present invention can be obtained by burning minerals in a cement kiln but it can also be obtained by mixing different sources of clinker, and indeed even by addition of pure mineralogical phases to an industrial sulfoaluminate clinker in order to enrich it in the mineralogical phase, in particular in ye'elimite and in mayenite.

The treatment process according to the invention advantageously comprises the mixing of said soil with the hydraulic binder in soil/binder proportions by weight of between 1 and 20 parts, preferably from 2 to parts, of binder per 100 parts of soil, more preferably still the mixing of said soil with the hydraulic binder in soil/binder proportions by weight of between 5 and 20 parts, more preferably between 5 and 10 parts, of binder per 100 parts of soil.

Advantageously, said hydraulic binder does not include a setting accelerator.

According to a first embodiment of the invention, the hydraulic binder is advantageously composed of a sulfoaluminate clinker including more than 50% by weight of ye'elimite $C_4A_3\$$ phase, less than 15%, preferably from 5% to less than 15%, by weight of belite $C_2S$ phase and from 1% to 5% by weight of free lime CaO.

According to a second embodiment of the invention, the hydraulic binder includes at least 20%, preferably at least 30%, by weight of said sulfoaluminate clinker and one or more compounds chosen from cement, Portland clinker, lime, in particular quick lime, a filler (chemically inert compound), admixtures having a pozzolanic effect (having a role in the development of the long-term strengths), such as slag, fly ash, silica fume or pozzolana, and optionally one or more additives, such as a setting accelerator or a chromium reducer.

Advantageously, the hydraulic binder includes quick lime, in particular in an amount of less than 50%, preferably from 5% to 40%, more preferably from 10% to 20%, by weight of lime.

The process according to the present invention can advantageously be used for the stabilization of soils in situ or before landfilling, which soils are polluted in particular by sulfate anions and/or heavy metal cations.

The soil thus treated by the process of the invention can have an advantageous use in road bases or backfills.

The invention will be described in more detail in the nonlimiting examples below, with reference to the single appended FIGURE, in which the graph represents the variation in content of sulfate ions in the leachate of a contaminated soil as a function of the amount of hydraulic binder according to the invention used to treat said soil.

EXAMPLES

1—Preparation of the Clinkers

The clinkers according to the present invention are prepared by burning, at a temperature of between 1000° C. and 1200° C., a raw mix composed of limestone, clay and bauxite which are mixtures of different oxides, in particular CaO, $SiO_2$, $Al_2O_3$, $Fe_3O_2$ and $SO_3$, according to the as yet unpublished patent application PCT/EP2011/070116.

It is important to note that, in the context of the present invention, the starting materials constituting the raw mix (mixture of the minerals before burning) are proportioned in order to obtain a sulfoaluminate binder and not a high-alumina binder.

After burning, the clinker is cooled in ambient air and then ground in order to obtain a Blaine fineness of the order of 4000 $cm^2/g$ and a particle size of less than approximately 40 micrometers. The mineralogical compositions of two sulfoaluminate clinkers according to the invention are presented in table 1.

TABLE 1

|  | Clinker A | Clinker C |
| --- | --- | --- |
| $C_4A_3\$$ | 63.3 | 61.4 |
| $C_2S$ | 11 | 11.2 |
| C$ | 3.1 | 8.7 |
| $C_9S_3\$_3\cdot CaF_2$ | 11.4 | <0.5 |
| $C_{12}A_7$ | 2.6 | <0.5 |
| $C_3s$ | <0.5 | 4.1 |
| $C_2AS$ | <0.5 | 2.9 |
| $C_4AF$ | 2.3 | 4.1 |
| CT | 1 | 3.3 |
| $K_2SO_4$ | <0.5 | 2.1 |
| MgO | 5.2 | <0.5 |
| $C_3A$ | <0.5 | 1.7 |
| C | <0.5 | <0.5 |
| CH | <0.5 | 0.6 |

(In this table 1, $CaF_2$ represents fluorine)

2—Treatment Process

The process for the treatment of a contaminated material (such as a polluted soil) with a hydraulic binder based on sulfoaluminate clinker according to the invention was carried out according to the following stages:

an amount of crude earth is sieved at 4 mm (Saulas, France, Sieve, certified NF ISO 3310), so as to obtain 1 kg of earth to be treated (contaminated material).

1 kg of sieved earth to be treated (contaminated material) is placed in a mixer (MLX40D, CAD France) in the presence of a predetermined amount of sulfoaluminate hydraulic binder, expressed as % by weight of binder with respect to the weight of contaminated material.

The earth/binder mixture is then subjected to a stage of homogenization by slow-speed mixing (140 revolutions/minute) for 1 minute. The water is then added according to a Water/Binder ratio by weight equal to 1.

The combined mixture is then mixed at slow speed for 2 minutes and then at high speed (285 revolutions/minute) for 2 minutes. The entire contents of the mixer are then poured into a plastic bag (polyethylene bag, 3 liters), which is then hermetically closed so as to simulate storage in a pile. The treated earth is matured over a period of time of 1 week at ambient temperature.

The treated material is subsequently dried at 40° C. in an oven and then optionally crushed (BB 200 Tungsten Carbide, Retsch, Germany) to a particle size of less than 4 mm in order to carry out the leaching tests.

3—Leaching Process

In accordance with the abovementioned Directive which defines the classes of dangerousness, the standard NF EN-12457-2 was used for the leaching tests.

The tests are carried out on a material, at least 95% of the particles (by weight) of which have a size less than the 4 mm sieve.

A sample of 350 g of crude material is sieved with the 4 mm sieve. The oversize at 4 mm is subjected to crushing in order to obtain a zero oversize at this sieve, and the combined product is mixed in order to obtain the sample which will be subjected to the leaching test.

For the analyses and the leaching tests, the weight of dry matter ($w_d$) of the sample is determined after transfer to an oven at 105° C.±5° C. to a constant weight in accordance with the standard ISO 11465.

Leaching Test

The starting sample $w_{leach}$ is 90 g±0.5 g (measured with an accuracy of 0.1 g) of dry matter.

The leaching test is carried out at ambient temperature, i.e. 20° C.±5° C., in a one liter flask in the presence of an amount of leachant (deionized water, 18 MΩ) equivalent to a liquid/solid (L/S) ratio by weight of 10±2%. The stoppered flask is placed in an overhead shaker (Heidolph REAX 20) at approximately 10 revolutions/min and shaken for 24 hours±0.5 h. In addition to the samples, leaching "blanks" are also carried out.

After halting the shaking, the suspended solids are left to settle out for 15 min±5 min and then filtered under vacuum through a 0.45 μm membrane filter.

The eluate is subsequently divided into an appropriate number of subsamples for the different chemical analyses and is stored according to the standard EN ISO 5667-3.

The analysis of the elements (heavy metals) is carried out by ICP-AES (inductively coupled plasma-atomic emission spectrometry) analysis (Iris Advantage, Thermo Jarrell Ash) according to a protocol in accordance with the standard NF EN ISO 11885.

The analysis of the anions is carried out by ion chromatography (ICS 2000, Dionex, USA) according to a procedure in accordance with the standard NF EN ISO 10304-1.

The soluble fraction (SF) is calculated according to the following equation:

$$SF = \frac{[(w_1 - w_0)(0.9 + (0.001 \times w_{leach} \times c_{moisture})]}{(0.001 \times V_{ext} \times w_{leach} \times (1 - c_{moisture}))}$$

$w_1-w_0=w_d$=weight of the sample dried in the oven at 105° C. (in grams)
$w_{leach}$=weight of the sample for leaching (in grams)
$c_{moisture}$=moisture content of the sample (in grams)
$V_{ext}$=volume withdrawn for measuring the solids content (in milliliters).

In the continuation of the document, SF is expressed as %. In the abovementioned Directives, SF is expressed in mg/kg. The value of 1% is equivalent to 10 000 mg/kg.

Reference Samples

All the tests carried out here were carried out starting from earth from the Autonomous Port of Paris, earth excavated from a former industrial site where an incineration plant was active at Issy-les-Moulineaux near Paris.

The earth from the Port of Paris constitutes a polluted soil, also known as contaminated material, within the meaning of the present invention, the substrate being the earth and the pollutants being the different elements or ions present in significant amounts in this earth.

Sample 1

Sample 1 is a crude sample of earth from the Autonomous Port of Paris. This sample 1 has not been subjected to leaching. Its water content is approximately 15% by weight.

Samples 2 and 3

Samples 2 and 3 correspond to the analysis of two leachates of earth from the Port of Paris.

The assays of the different pollutants present in the crude sample 1 and with regard to the leachates (samples 2 and 3) are combined in table 2.

The values of the elements and ions assayed are expressed in mg/kg of dry matter.

The soluble fraction represents the total amount of chemical elements passing in the solution with respect to the amount of initial dry material, expressed as % of dry matter.

TABLE 2

|  | Sample 1 (crude earth) | Sample 2 (leachate) | Sample 3 (leachate) |
| --- | --- | --- | --- |
| As | 53 | <0.2 | <0.2 |
| Ba | 769 | 0.471 | 0.34 |
| Cd | 5 | 0.114 | <0.1 |
| Cu | 798 | 0.253 | <0.2 |
| Hg | <3 | <0.1 | <0.002 |
| Ni | 107 | 0.127 | <0.100 |
| Pb | 1454 | 0.115 | <0.350 |
| Sb | 47 | <0.2 | <0.500 |
| Se | <5 | <0.2 | <0.400 |
| Zn | 1163 | 0.375 | <0.200 |
| Cl$^-$ | 68.7 | 68.7 | 24 |
| SO$_4^{2-}$ | 9400 | 6859 | 7532 |
| SF (Soluble fraction) | — | 1.18 | 1.2 |

The results of this table 2 show that the main leachable elements and thus the main elements constituting pollutants are the anions, in particular the sulfates. The contents of leached sulfates have the consequence of bringing the earth into class II according to Directive 1999/31/EC of the Council of 26 Apr. 1999 for the landfilling thereof. The value of the soluble fraction (of between 0.4% and 6.0%) also brings about a classification in category II.

Sample 2 is selected in the examples below as reference for measuring the effectiveness of the different binders.

Example 1

Sample 4

Sample 4 corresponds to the treatment of a sample of earth from the Port of Paris with 10% (by weight) of a sulfoaluminate hydraulic binder according to the invention. The amount of water used in producing this sample corresponds to a Water/Binder ratio equal to 1.

Example 2 (Comparative)

Sample 5

Sample 5 corresponds to the treatment of a sample of earth from the Port of Paris with 10% (by weight) of a binder sold by Holcim under the trade name Inercem. The amount of water used in producing this sample corresponds to a Water/Binder ratio equal to 1.

Example 3 (Comparative)

Sample 6

Sample 6 corresponds to the treatment of a sample of earth from the Port of Paris with 20% by weight of a binder sold by Ciment Calcia under the trade name Ligex FPL1.

The amount of water used in producing this sample corresponds to a Water/Binder ratio equal to 1.

All of these results are combined in table 3.

TABLE 3

|      | Sample 2 (reference) | Sample 4 (10% binder) | Sample 5 (comparative) | Sample 6 (comparative) |
|------|------|------|------|------|
| As   | <0.2 | <0.3 | <0.3 | <0.2 |
| Ba   | 0.471 | 0.698 | 0.425 | 0.986 |
| Cd   | 0.114 | <0.1 | <0.1 | <0.1 |
| Cu   | 0.253 | 0.263 | <0.2 | 0.269 |
| Hg   | <0.1 | <0.1 | <0.1 | <0.1 |
| Ni   | 0.127 | <0.1 | <0.1 | <0.1 |
| Pb   | 0.115 | <0.35 | <0.35 | <0.1 |
| Sb   | <0.2 | <0.5 | <0.5 | <0.2 |
| Se   | <0.2 | <0.4 | <0.4 | <0.2 |
| Zn   | 0.375 | <0.2 | <0.2 | 0.317 |
| Cl$^-$ | 68.7 | 311 | 59 | 99 |
| SO$_4^{2-}$ | 6859 | 2305 | 8968 | 4322 |
| SF % | 1.18 | 0.6 | 1.32 | 0.96 |

It is observed that the treatment with the Inercem binder does not make it possible to lower the amount of sulfate entrained in the leachate, unlike the treatment with a sulfoaluminate hydraulic binder according to the invention, which makes it possible, with a small amount of hydraulic binder (10% by weight), to reduce by more than 60% the content of sulfates in the leachate. The treatment with the Ligex FPL1 binder makes it possible to reduce the amount of sulfate but in a lower proportion than the treatment with a sulfoaluminate hydraulic binder according to the invention.

It is also observed that the use of Inercem does not make it possible to reduce the soluble fraction of the earth, unlike the sulfoaluminate hydraulic binder according to the invention. The treatment with Ligex FLP1 makes it possible to reduce the soluble fraction but less effectively than the sulfoaluminate hydraulic binder.

Example 4: Treatment with Different Proportions of Binder

Samples 7, 8, 9 and 10 correspond to the treatment of a sample of earth from the Port of Paris with respectively 5%, 15%, 20% and 40% (by weight) of a sulfoaluminate hydraulic binder according to the invention including 100% of clinker A. The amount of water used in producing this sample corresponds to a Water/Binder ratio equal to 1. The results are presented in table 4.

TABLE 4

|      | Sample 2 (reference) | Sample 7 (5% binder) | Sample 4 (10% binder) | Sample 8 (15% binder) | Sample 9 (20% binder) | Sample 10 (40% binder) |
|------|------|------|------|------|------|------|
| As   | <0.2 | <0.3 | <0.3 | <0.3 | <0.2 | <0.3 |
| Ba   | 0.471 | 0.467 | 0.698 | 0.811 | 1.2 | 0.623 |
| Cd   | 0.114 | <0.1 | <0.1 | <0.1 | <0.1 | <0.1 |
| Cu   | 0.253 | <0.2 | 0.263 | 0.508 | 0.367 | 0.431 |
| Hg   | <0.1 | <0.001 | <0.1 | <0.001 | <0.002 | <0.001 |
| Ni   | 0.127 | <0.1 | <0.1 | <0.1 | <0.100 | <0.1 |
| Pb   | 0.115 | <0.350 | <0.35 | <0.350 | <0.350 | <0.350 |
| Sb   | <0.2 | <0.5 | <0.5 | <0.5 | <0.500 | <0.5 |
| Se   | <0.2 | <0.4 | <0.4 | <0.4 | <0.400 | <0.4 |
| Zn   | 0.375 | <0.2 | <0.2 | <0.2 | <0.200 | <0.2 |
| Cl$^-$ | 68.7 | 191 | 311 | 366 | 384 | 575 |
| SO$_4^{2-}$ | 6859 | 6200 | 2305 | 1606 | 1287 | 1158 |
| SF   | 1.18 | 0.99 | 0.6 | 0.66 | 0.81 | 1.05 |

It is observed that the stabilization of the sulfates of the earth is a function of the amount of sulfoaluminate hydraulic binder according to the invention used. The change in the concentrations of sulfates in the leachates of the earths treated shows the effectiveness of the stabilization increases significantly with the amount of sulfoaluminate hydraulic binder according to the invention used for the treatment, provided that the percentage by weight of binder used is greater than or equal to 10%. Beyond 10%, the stabilization of the sulfate also improves but at a lesser rate.

These results are represented diagrammatically on the graph of the appended FIGURE. The graph represents the variation in sulfate ions, expressed as ppm (or mg/kg of material treated), in the leachate (represented on the axis of the ordinates) as a function of the percentage by weight of hydraulic binder according to the invention used to treat the contaminated soil (represented on the axis of the abscissa).

Example 5: Treatment with Hydraulic Binders of Different Compositions

Sample 11

Sample 11 corresponds to the treatment of a sample of earth from the Port of Paris with 20% (by weight) of hydraulic binder according to the invention, said hydraulic binder comprising 50% of sulfoaluminate clinker and 50% of CEM I cement (CEM I 52.5 N from Couvrot). The amount of water used in producing this sample corresponds to a Water/Binder ratio equal to 1.

Sample 12

Sample 12 corresponds to the treatment of a sample of earth from the Port of Paris with 20% (by weight) of a hydraulic binder according to the invention, said hydraulic binder comprising 90% of sulfoaluminate clinker and 10% of CaO. The amount of water used in producing this sample corresponds to a Water/Binder ratio equal to 1.

The results of these two tests are collated in table 5 and compared with sample 9 carried out with the same amount of sulfoaluminate hydraulic binder according to the invention comprising 100% of clinker A.

TABLE 5

|  | Sample 2 (reference) | Sample 11 (20% binder) | Sample 12 (20% binder) | Sample 9 (20% binder) |
|---|---|---|---|---|
| As | <0.2 | <0.2 | <0.3 | <0.2 |
| Ba | 0.471 | 0.545 | 0.615 | 1.2 |
| Cd | 0.114 | <0.1 | <0.1 | <0.1 |
| Cu | 0.253 | 0.88 | 0.627 | 0.367 |
| Hg | <0.1 | <0.001 | <0.001 | <0.002 |
| Ni | 0.127 | <0.1 | <0.1 | <0.100 |
| Pb | 0.115 | <0.350 | <0.350 | <0.350 |
| Sb | <0.2 | <0.5 | <0.5 | <0.500 |
| Se | <0.2 | <0.2 | <0.4 | <0.400 |
| Zn | 0.375 | <0.2 | <0.2 | <0.200 |
| Cl$^-$ | 68.7 | 107 | 246 | 384 |
| SO$_4^{2-}$ | 6859 | 810 | 969 | 1287 |
| SF | 1.18 | 0.63 | 0.77 | 0.81 |

It is noted that the presence of CaO and/or of CEM I cement makes it possible to further lower the content of sulfates in the leachate.

Example 6: Treatment with Adjuvant-Treated Binders

Sample 13

Sample 13 corresponds to the treatment of a sample of earth from the Port of Paris with 20% (by weight) of a sulfoaluminate hydraulic binder according to the invention including 99.7% of clinker A and 0.3% of lithium carbonate (Li$_2$CO$_3$). The amount of water used in producing this sample corresponds to a Water/Binder ratio equal to 1. The results of the analysis of the leachate are presented in table 6, in comparison with those of sample 9 treated with the same proportion of sulfoaluminate hydraulic binder according to the invention.

TABLE 6

|  | Sample 2 (reference) | Sample 13 (20% binder) | Sample 9 (20% binder) |
|---|---|---|---|
| As | <0.2 | <0.2 | <0.2 |
| Ba | 0.471 | 1.2 | 1.2 |
| Cd | 0.114 | <0.1 | <0.1 |
| Cu | 0.253 | 0.23 | 0.367 |
| Hg | <0.1 | <0.1 | <0.002 |
| Ni | 0.127 | <0.1 | <0.100 |
| Pb | 0.115 | <0.1 | <0.350 |
| Sb | <0.2 | <0.2 | <0.500 |
| Se | <0.2 | <0.2 | <0.400 |
| Zn | 0.375 | <0.2 | <0.200 |
| Cl$^-$ | 68.7 | 401 | 384 |
| SO$_4^{2-}$ | 6859 | 810 | 1287 |
| SF | 1.18 | 0.65 | 0.81 |

It may be noted that the use of additive, such as a setting accelerator based on lithium carbonate, makes it possible to further increase the capacity for stabilization of the sulfates of the sulfoaluminate binder, the content of sulfate passing below 1000 ppm in the leachate.

Example 7: Treatment with Binders Comprising Quick Lime

Samples 14 and 17 correspond to the analysis of two leachates of earth from the Port of Paris. They are subjected to leaching under the same conditions as above (samples 2 and 3) and constitute two separate references in this example 7.

Sample 15 corresponds to the treatment of a sample of earth from the Port of Paris (same source as reference sample 14) with 6% (by weight) of a sulfoaluminate hydraulic binder according to the invention including 75% of clinker A and 25% of quick lime. The amount of water used in producing this sample corresponds to a Water/Binder ratio equal to 1. The results of the analysis of the leachate are presented in table 7, in comparison with those of samples 14 and 16.

Sample 16 corresponds to the treatment of a sample of earth from the Port of Paris (same source as reference sample 14) with 4% (by weight) of a sulfoaluminate hydraulic binder according to the invention including 75% of clinker A and 25% of quick lime. The amount of water used in producing this sample corresponds to a Water/Binder ratio equal to 1. The results of the analysis of the leachate are presented in table 7, in comparison with those of samples 14 and 15.

TABLE 7

|  | Sample 14 (reference) | Sample 15 (6% binder) | Sample 16 (4% binder) |
|---|---|---|---|
| As | <0.2 | <0.2 | <0.2 |
| Ba | 0.347 | 0.819 | 0.707 |
| Cd | <0.1 | <0.04 | <0.04 |
| Cu | 0.234 | 0.292 | 0.244 |
| Hg | 0.019 | 0.01 | 0.004 |
| Ni | <0.1 | <0.05 | <0.05 |
| Pb | <0.1 | <0.1 | <0.1 |
| Sb | 0.222 | <0.06 | <0.06 |
| Se | <0.2 | <0.08 | <0.08 |
| Zn | <0.2 | <0.05 | <0.05 |
| Cl$^-$ | 139 | 146 | 161 |
| SO$_4^{2-}$ | 4517 | 1428 | 1750 |
| SF | 0.61 | 0.65 | 0.60 |

Sample 18 corresponds to the treatment of a sample of earth from the Port of Paris (same source as reference sample 17) with 6% (by weight) of a sulfoaluminate hydraulic binder according to the invention including 66.7% of clinker A and 33.3% of quick lime. The amount of water used in producing this sample corresponds to a Water/Binder ratio equal to 1. The results of the analysis of the leachate are presented in table 8, in comparison with those of samples 17 and 19.

Sample 19 corresponds to the treatment of a sample of earth from the Port of Paris (same source as reference sample 17) with 4% (by weight) of a sulfoaluminate hydraulic binder according to the invention including 50% of clinker A and 50% of quick lime. The amount of water used in producing this sample corresponds to a Water/Binder ratio equal to 1. The results of the analysis of the leachate are presented in table 8, in comparison with those of samples 17 and 18.

TABLE 8

|  | Sample 17 (reference) | Sample 18 (6% binder) | Sample 19 (4% binder) |
|---|---|---|---|
| As | <0.2 | <0.2 | <0.2 |
| Ba | 0.438 | 0.821 | 0.733 |
| Cd | <0.1 | <0.04 | <0.04 |
| Cu | <0.2 | 0.557 | 0.677 |
| Hg | 0.004 | 0.004 | 0.006 |
| Ni | <0.1 | <0.05 | <0.05 |

TABLE 8-continued

|  | Sample 17 (reference) | Sample 18 (6% binder) | Sample 19 (4% binder) |
|---|---|---|---|
| Pb | <0.1 | <0.1 | <0.1 |
| Sb | <0.2 | <0.06 | <0.06 |
| Se | <0.2 | <0.08 | <0.08 |
| Zn | <0.2 | <0.05 | <0.05 |
| Cl$^-$ | 181 | 209 | 172 |
| SO$_4^{2-}$ | 4696 | 730 | 691 |
| SF | 0.91 | 0.59 | 0.39 |

Example 8: Treatment with Pure Mineralogical Phases

Samples 20 to 24 correspond to treatments carried out with binders obtained from pure mineralogical phases, that is to say that the clinkers used do not originate from a cement furnace but from a laboratory. These samples are compared with the reference sample 17 described in example 7.

Sample 20 corresponds to the treatment of a sample of earth from the Port of Paris (same source as reference sample 17) with 5% (by weight) of a hydraulic binder according to the invention including 100% of ye'elimite (100% Y). The amount of water used in producing this sample corresponds to a Water/Binder ratio equal to 1. The results of the analysis of the leachate are presented in table 9.

Sample 21 corresponds to the treatment of a sample of earth from the Port of Paris (same source as reference sample 17) with 5% (by weight) of a hydraulic binder according to the invention including 60% of ye'elimite and 40% of quick lime (60% Y/40% CaO). The amount of water used in producing this sample corresponds to a Water/Binder ratio equal to 1. The results of the analysis of leachate are presented in table 9.

Sample 22 corresponds to the treatment of a sample of earth from the Port of Paris (same source as reference sample 17) with 5% (by weight) of a hydraulic binder according to the invention including 80% of ye'elimite (Y) and 20% of quick lime (80% Y/20% CaO). The amount of water used in producing this sample corresponds to a Water/Binder ratio equal to 1. The results of the analysis of the leachate are presented in table 9.

TABLE 9

|  | Sample 17 (reference) | Sample 20 (100% Y) | Sample 21 (60% Y/40% CaO) | Sample 22 (80% Y/20% CaO) |
|---|---|---|---|---|
| As | <0.2 | <0.2 | <0.2 | <0.2 |
| Ba | 0.438 | 0.443 | 0.552 | 0.637 |
| Cd | <0.1 | <0.05 | <0.05 | <0.05 |
| Cu | <0.2 | 0.159 | 0.513 | 0.170 |
| Hg | 0.004 | 0.045 | 0.093 | 0.067 |
| Ni | <0.1 | <0.05 | <0.05 | <0.05 |
| Pb | <0.1 | <0.1 | <0.1 | <0.1 |
| Sb | <0.2 | <0.1 | <0.1 | <0.1 |
| Se | <0.2 | <0.1 | <0.1 | <0.1 |
| Zn | <0.2 | <0.05 | <0.05 | <0.05 |
| Cl$^-$ | 181 | 172 | 156 | 161 |
| SO$_4^{2-}$ | 4696 | 2200 | 633 | 532 |
| SF | 0.91 | 0.66 | 0.71 | 0.96 |

Sample 23 corresponds to the treatment of a sample of earth from the Port of Paris (same source as reference sample 17) with 5% (by weight) of a hydraulic binder according to the invention including 70% of ye'elimite, 20% of mayenite and 10% of quick lime (70% Y/20% M/10% CaO). The amount of water used in producing this sample corresponds to a Water/Binder ratio equal to 1. The results of the analysis of the leachate are presented in table 10.

Sample 24 corresponds to the treatment of a sample of earth from the Port of Paris (same source as reference sample 17) with 5% (by weight) of a hydraulic binder according to the invention including 50% of ye'elimite, 20% of mayenite and 30% of quick lime (50% Y/20% M/30% CaO). The amount of water used in producing this sample corresponds to a Water/Binder ratio equal to 1. The results of the analysis of the leachate are presented in table 10.

TABLE 10

|  | Sample 17 (reference) | Sample 23 (70% Y/20% M/10% CaO) | Sample 24 (50% Y/20% M/30% CaO) |
|---|---|---|---|
| As | <0.2 | <0.2 | <0.2 |
| Ba | 0.438 | 0.763 | 0.552 |
| Cd | <0.1 | <0.05 | <0.04 |
| Cu | <0.2 | 0.142 | 0.296 |
| Hg | 0.004 | 0.007 | 0.022 |
| Ni | <0.1 | <0.05 | <0.05 |
| Pb | <0.1 | <0.1 | <0.1 |
| Sb | <0.2 | <0.1 | <0.06 |
| Se | <0.2 | <0.1 | <0.08 |
| Zn | <0.2 | <0.05 | <0.05 |
| Cl$^-$ | 181 | 143 | 142 |
| SO$_4^{2-}$ | 4696 | 389 | 592 |
| SF | 0.91 | 1.05 | 0.9 |

The invention claimed is:

1. A process for the treatment of polluted soils, in particular of soils exhibiting a leachable fraction of greater than 0.4%, said leachable fraction predominantly including anions sulfate ions, and/or heavy metals,
   wherein said process comprises the mixing of said soil
   with a hydraulic binder based on sulfoaluminate clinker in soil/binder proportions by weight of between 1 and 40 parts of binder per 100 parts of soil, said sulfoaluminate clinker
   including more than 50% by weight of ye'elimite C4A3$ phase, less than 15% by weight of belite C2S phase and from 1% to 5% by weight of free lime CaO, and wherein
   said sulfoaluminate clinker includes from 2% to 12% by weight of mayenite $C_{12}A_7$ phase or of a mayenite isotype.

2. The treatment process as claimed in claim 1, wherein the sulfoaluminate clinker includes more than 60% by weight of ye'elimite C4A3 $ phase.

3. The treatment process as claimed in claim 1, wherein the sulfoaluminate clinker includes from 5% to less than 15% by weight of belite C2S phase.

4. The treatment process as claimed in claim 1, wherein said process comprises the mixing of said soil with the hydraulic binder in soil/binder proportions by weight of between 1 and 20 parts of binder per 100 parts of soil.

5. The treatment process as claimed in claim 4, wherein said process comprises the mixing of said soil with the hydraulic binder in soil/binder proportions by weight of between 5 and 20 parts of binder per 100 parts of soil.

6. The treatment process as claimed in claim 1, wherein the hydraulic binder is composed solely of a sulfoaluminate clinker including more than 50% by weight of ye'elimite C4A3 $ phase, less than 15% by weight of belite C2S phase and from 1% to 5% by weight of free lime CaO.

7. The process as claimed in claim 1, wherein said hydraulic binder does not include a setting accelerator.

8. The process as claimed in claim 1, wherein said hydraulic binder includes at least 20% by weight of said sulfoaluminate clinker and one or more compounds chosen from cement, Portland clinker, lime, a filler, admixtures having a pozzolanic effect, and optionally one or more additives.

9. The process as claimed in claim 8, wherein said hydraulic binder includes quick lime in an amount of less than 50% by weight.

10. A process for the stabilization of soils, which soils are polluted in particular by sulfate anions and/or heavy metal cations, said process comprising the steps of:
mixing said soils with a hydraulic binder based on sulfoaluminate clinker in soil/binder proportions by weight of between 1 and 40 parts of binder per 100 parts of soil, said sulfoaluminate clinker including more than 50% by weight of ye'eliminate C4A3$ phase, less than 15% by weight of belite C2S phase and from 1% to 5% by weight of free lime CaO and from 2% to 12% by weight of mayenite $C_{12}A_7$ phase or of a mayenite isotype,
wherein said mixing is either one of in situ in the soil to be treated or said mixing is performed with said soil prior to landfilling.

11. The process as claimed in claim 10 wherein the soil prior to treatment has a water content of less than 40% by weight.

12. The process as claimed in claim 10, wherein said method further includes the step of depositing said soil, treated by said process in road bases or backfills.

13. The treatment process as claimed in claim 3, wherein the sulfoaluminate clinker includes from from 8% to 13% by weight of belite C2S phase.

14. The treatment process as claimed in claim 1, wherein the sulfoaluminate clinker includes from 2% to 3% by weight of mayenite $C_{12}A_7$ phase or of a mayenite isotype.

15. The treatment process as claimed in claim 4, wherein said process comprises the mixing of said soil with the hydraulic binder in soil/binder proportions by weight of between 2 and 20 parts of binder per 100 parts of soil.

16. The treatment process as claimed in claim 5, wherein said process comprises the mixing of said soil with the hydraulic binder in soil/binder proportions by weight of between 5 and 10 parts of binder per 100 parts of soil.

17. The process as claimed in claim 8, wherein said hydraulic binder includes at least 30% by weight of said sulfoaluminate clinker and one or more compounds chosen from cement, Portland clinker, lime, a filler, admixtures having a pozzolanic effect, and optionally one or more additives.

18. The process as claimed in claim 11 wherein the soil prior to treatment has a water content of less than 30% by weight.

* * * * *